US009781816B2

(12) United States Patent
Cook et al.

(10) Patent No.: US 9,781,816 B2
(45) Date of Patent: Oct. 3, 2017

(54) INTERCHANGEABLE POWER CONTACT FOR A PLASMA ARC CUTTING SYSTEM

(71) Applicant: Hypertherm, Inc., Hanover, NH (US)

(72) Inventors: David J. Cook, Bradford, VT (US); David L. Bouthillier, Hartford, VT (US)

(73) Assignee: Hypertherm, Inc., Hanover, NH (US)

( * ) Notice: Subject to any disclaimer, the term of this patent is extended or adjusted under 35 U.S.C. 154(b) by 69 days.

(21) Appl. No.: 14/887,591

(22) Filed: Oct. 20, 2015

(65) Prior Publication Data

US 2016/0113102 A1 Apr. 21, 2016

Related U.S. Application Data

(60) Provisional application No. 62/066,195, filed on Oct. 20, 2014.

(51) Int. Cl.
*B23K 10/00* (2006.01)
*H05H 1/34* (2006.01)

(52) U.S. Cl.
CPC ....... *H05H 1/34* (2013.01); *H05H 2001/3457* (2013.01); *H05H 2001/3473* (2013.01)

(58) Field of Classification Search
CPC ............. H05H 1/34; H05H 2001/3457; H05H 2001/3472; H05H 1/26
USPC .............. 219/121.48, 121.52, 121.5, 121.54, 219/121.39, 121.45
See application file for complete search history.

(56) References Cited

U.S. PATENT DOCUMENTS 5,676,864 A * 10/1997 Walters .................... H05H 1/34 219/119
6,362,450 B1 * 3/2002 Severance, Jr. .......... H05H 1/34 219/121.5
7,081,597 B2 7/2006 Severance, Jr.
7,423,235 B2 9/2008 Severance, Jr.
8,581,139 B2 11/2013 Severance, Jr.
9,386,679 B2 * 7/2016 Bauer ...................... H05H 1/28
9,398,679 B2 * 7/2016 Namburu ................ H05H 1/34
2003/0209525 A1 * 11/2003 Walters .................... B23K 9/24 219/121.5
2007/0082533 A1 * 4/2007 Currier .................... H05H 1/34 439/352
2015/0319836 A1 * 11/2015 Sanders ................. B23K 10/00 219/121.49

* cited by examiner

*Primary Examiner* — Mark Paschall
(74) *Attorney, Agent, or Firm* — Proskauer Rose LLP

(57) ABSTRACT

A power contact for a liquid-cooled plasma arc cutting system is provided. The cutting system includes a torch body and a lower torch assembly. The power contact comprises a substantially hollow body including an upper portion and a lower portion, and an external surface of the upper portion of the hollow body configured to matingly engage the torch body. The power contact further includes a thread region disposed on an internal surface of the hollow body. The thread region is configured to retain an electrode holder of the lower torch assembly of the plasma arc cutting system to matingly engage the lower torch assembly and secure the lower torch assembly to the torch body.

10 Claims, 5 Drawing Sheets

INTERCHANGEABLE POWER CONTACT FOR A PLASMA ARC CUTTING SYSTEM

CROSS REFERENCE TO RELATED APPLICATION

This application claims the benefit of and priority to U.S. Provisional Patent Application No. 62/066,195, filed Oct. 20, 2014, the entire contents of which is owned by the assignee of the instant application and incorporated herein by reference in its entirety.

TECHNICAL FIELD

The present invention generally relates to a power contact for a liquid-cooled plasma arc cutting system, and more particularly, to a power contact that facilitates replacement of a lower torch assembly of a liquid-cooled plasma arc cutting system.

BACKGROUND

Existing plasma arc cutting systems include quick-change torches, offline setup features, and replaceable components. However, these systems do not include a single torch assembly that retains backward compatibility with known torch components (e.g., gas baffles, high frequency contact rings, electrode holders, high frequency wires, insulator bodies, and torch bodies) while allowing the components to be easily removed and replaced. Today's consumable components are typically repaired or replaced individually by end users rather than replaced as an entire torch assembly. For example, nozzles, electrodes, electrode holders and baffles are typically replaced by machine operators, while contact rings, high frequency wires, insulator bodies, and torch bodies are usually repaired or replaced by maintenance staff. Replacements of this nature can require significant system downtime and complex installation and removal processes. Such replacements can also limit torch and component flexibility and interchangeability.

SUMMARY

The current technology provides a quick-change torch for plasma cutting systems that allows serviceability of the lower torch body and backward and forward compatibility with multiple torch platforms by changing one component. An interchangeable threaded power contact enables one torch platform to be used across different power supplies, gas consoles, cut processes, and consumables. Different consumables can be used in the same torch by changing the power contact only.

In one aspect, a power contact for a liquid-cooled plasma arc cutting system is provided. The cutting system includes a torch body and a lower torch assembly. The power contact comprises a substantially hollow body including an upper portion and a lower portion, and an external surface of the upper portion of the hollow body configured to matingly engage the torch body. The power contact further includes a thread region disposed on an internal surface of the hollow body. The thread region is configured to retain an electrode holder of the lower torch assembly of the plasma arc cutting system to matingly engage the lower torch assembly and secure the lower torch assembly to the torch body.

In some embodiments, the hollow body orients the electrode holder and a gas baffle of the lower torch assembly relative to the torch body. The hollow body can radially and axially align an electrode and a nozzle of the lower torch assembly relative to the torch body. The hollow body can radially and axially align a gas baffle and a gas sealing member of the lower torch assembly relative to the torch body.

In some embodiments, the power contact is non-axially symmetric. An anti-rotation element can be disposed on at least one of the upper portion or lower portion for preventing the torch body from rotating relative to the power contact after engagement.

In some embodiments, the power contact is formed of at least one of copper, brass, silver, silver alloy or copper alloy. In some embodiments, the power contact is silver plated.

In some embodiments, at least a portion of the power contact is disposed within an insulator portion of the plasma arc cutting system. The insulator portion can be located in the lower torch assembly.

In some embodiments, a contact region is disposed on the external surface of the hollow body, where the contact region is configured to mate with a Louvertac™ element disposed on the torch body. The contact region can convey a current from the Louvertac™ element of the torch body to the lower torch assembly.

In some embodiments, a coolant flow path is provided within the substantially hollow body of the power contact to convey a coolant from the torch body to the lower torch assembly.

In another aspect, a plasma arc torch for a liquid-cooled plasma arc cutting system is provided. The torch includes an upper torch assembly defining an aperture and a lower torch assembly including a power contact thread region. At least one of the upper torch assembly or the lower torch assembly includes a first anti-rotation feature. The torch also includes a power contact for connecting the upper torch assembly with the lower torch assembly. The power contact includes an external surface configured to matingly engage the upper torch assembly via insertion into the aperture. The power contact also includes an internal thread surface configured to matingly engage the lower torch assembly via the power contact thread region of the lower torch assembly. The power contact further includes a second anti-rotation feature disposed on the external surface and adapted to complement the first anti-rotation feature to prevent rotation of the lower torch assembly relative to the upper torch assembly.

In some embodiments, the aperture and the power contact have complementary non-cylindrical cross sections.

In some embodiments, the upper torch assembly includes at least one Louvertac™ contact element disposed in the aperture to engage the power contact.

In some embodiments, the lower torch assembly includes an electrode holder with the power contact thread region disposed thereon for connection with the power contact.

In some embodiments, the power contact is electrically conductive and is configured to pass electricity from the upper torch assembly to the lower torch assembly. Additionally, the power contact is configured to convey a coolant flow from the upper torch assembly to the lower torch assembly.

In yet another aspect, a method for connecting a lower torch assembly to an upper torch assembly of a liquid-cooled plasma arc torch is provided. The method includes engaging a power contact with the upper torch assembly of the plasma arc torch via insertion into an aperture of the upper torch assembly. The method also includes connecting the lower torch assembly to the power contact, and preventing rotation of the power contact relative to the upper torch assembly by aligning an anti-rotation feature of the power contact with a corresponding anti-rotation feature of the lower torch assembly or upper torch assembly. The method further includes passing at least one of a current or a coolant flow from the upper torch assembly to the lower torch assembly via the power contact.

In some embodiments, the method further includes radially and axially aligning at least one of an electrode holder, a nozzle or a gas baffle of the lower torch assembly relative to the upper torch assembly.

In some embodiments, the method further includes forming the power contact from an electrically conductive material.

In some embodiments, the method further includes forming the lower torch assembly from an insulator material.

BRIEF DESCRIPTION OF THE DRAWING

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION

Figure 1A:
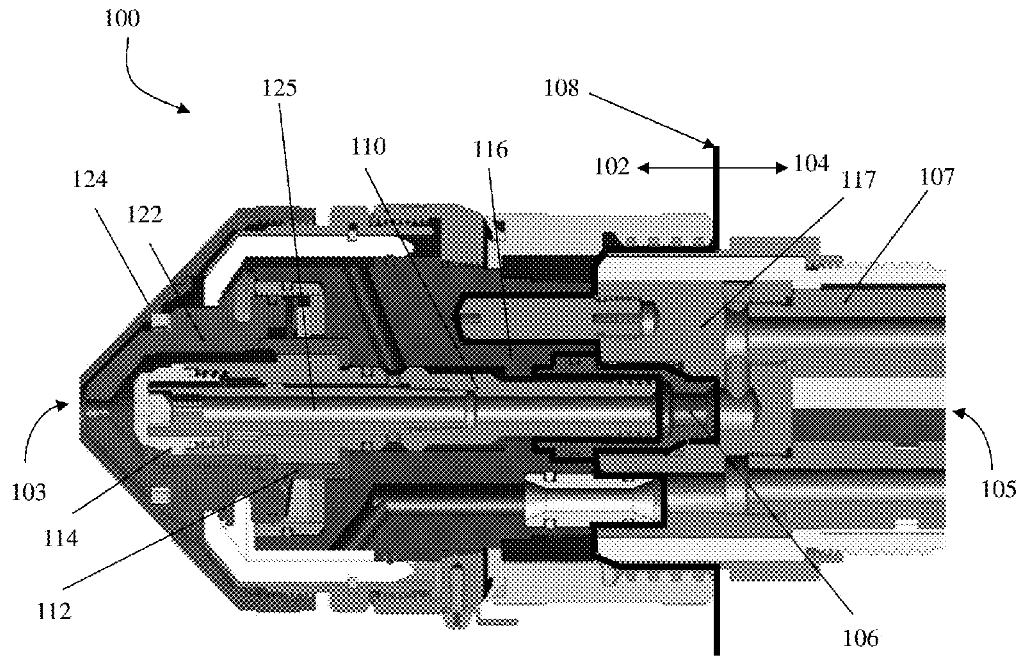
FIGS. 1*a* and *b* illustrate a cross-sectional view of a liquid-cooled plasma arc cutting torch with and without a bold line, respectively, indicating the boundary between an interchangeable lower torch assembly and an upper torch assembly.
Figure 1B:
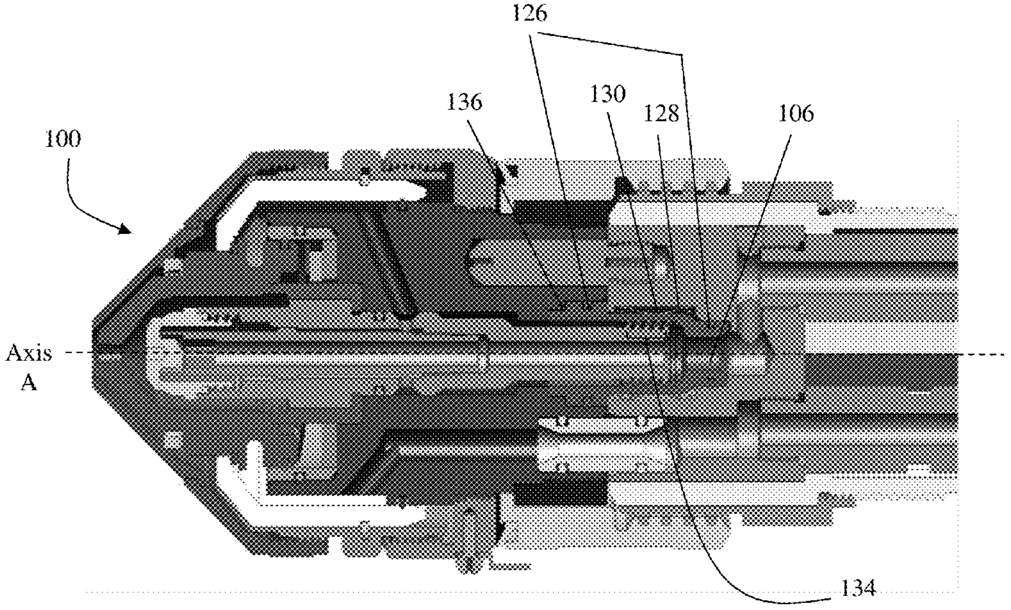

The present invention features a power contact connectable to an interchangeable lower torch assembly of a plasma arc torch to enable quick field and factory repair of one or more consumables in the lower torch assembly and easy installation of the lower torch assembly into an upper torch assembly of the torch body. FIGS. 1*a* and *b* illustrate a cross-sectional view of a liquid-cooled plasma arc cutting torch 100 with and without a bold line 108, respectively, indicating the boundary between an interchangeable lower torch assembly (or lower assembly) 102 and an upper torch assembly (or upper assembly) 104 of the torch body 107. The lower assembly 102 can be connected to the upper assembly 104 through a power contact 106. The torch 100 includes a distal end 103, which is the end positioned closest to a workpiece (not shown) during torch operation, and a proximal end 105, which is the end opposite of the distal end 103. As shown, the lower assembly 102 is disposed on the distal end 103 of the torch 100 upon assembly and the upper assembly 104 is disposed on the proximal end 105. The lower assembly 102 can include a host of consumable components, including an electrode holder 110 configured to retain an electrode 114, a gas baffle 112 configured to impart a swirling motion to a gas introduced therethrough, a water tube 125, a gas sealing member 126, a nozzle 122 and a shield 124.

In some embodiments, the upper torch assembly 104 is a permanent, non-removable portion of the torch body 107, while the lower assembly 102 is replaceable and interchangeable. In some embodiments, the power contact 106 can slideably mate with the electrode holder 110 of the lower assembly 102, thereby retaining the electrode holder 110, the gas baffle 112 and other consumable components in the lower assembly 102 and generally coupling the lower torch assembly 102 to the power contact 106. In some embodiments, the power contact 106 is adapted to mate with an insulator 116 of the lower assembly 102 and a conductor 117 of the upper assembly 104 of the plasma arc torch 100 to further couple the lower assembly 102 and the upper assembly 104 together. Additionally, the power contact 106 can be serviced from the distal end 103 of the torch 100, without spinning or use of extra tools. The water tube 125 and/or the electrode holder 110 can also be easily removed from the lower torch assembly 102 without the need of additional tooling. Thus, the present technology enables a lower cost torch setup and increased compatibility with standardized consumable components.

Figure 2A:
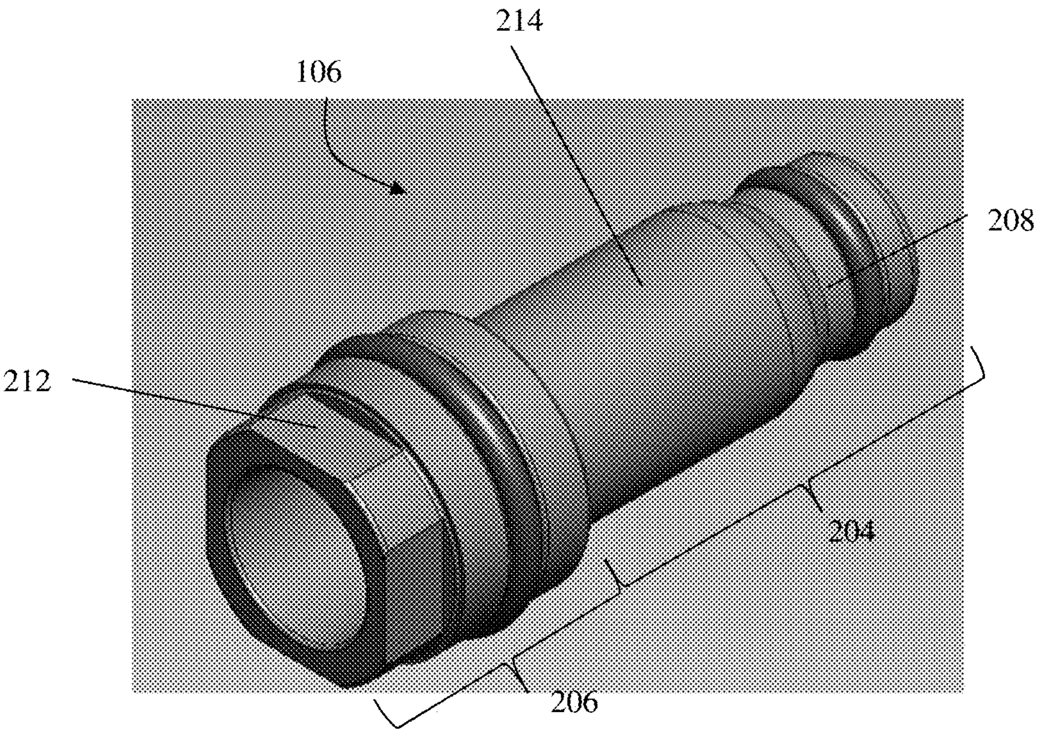
FIGS. 2*a* and *b* illustrate isometric and sectional views, respectively, of the power contact of FIG. 1.
Figure 2B:
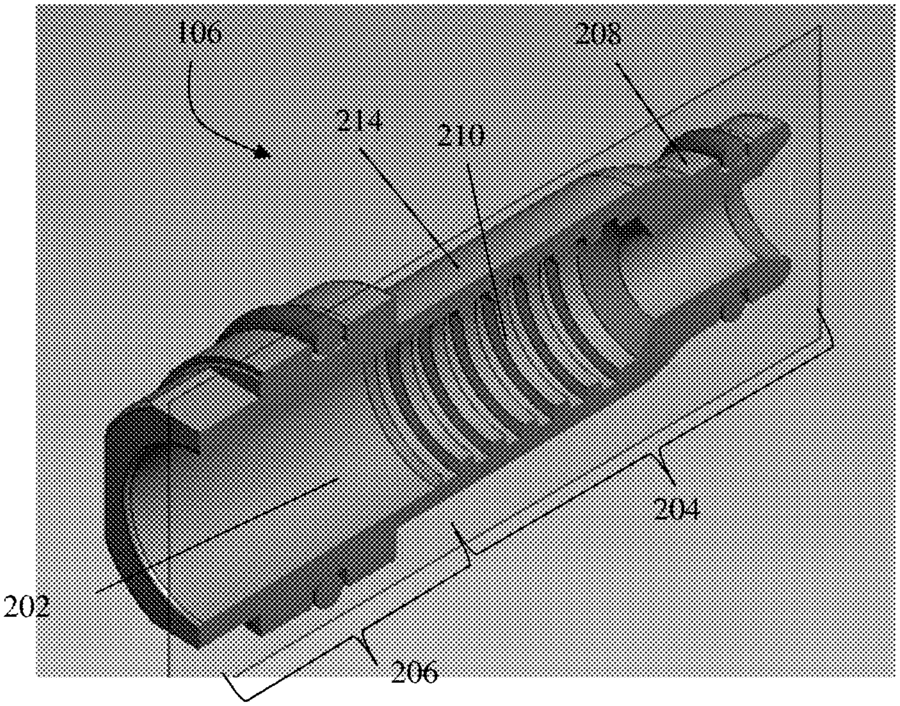

FIGS. 2*a* and *b* illustrate isometric and cross-sectional views, respectively, of the power contact 106 of FIGS. 1*a* and *b*. As shown, the power contact 106 includes a substantially hollow body 202 that has a lower portion 206 positioned close to the distal end 103 of the torch 100 and an upper portion 204 positioned close to the proximal end 105. The upper portion 204 can include a thread region 210 disposed on an internal surface of the hollow body 202. The thread region 210 is configured to removably engage the electrode holder 110 of the lower assembly 102, thereby securing the lower assembly 102 to the power contact 106. In other embodiments, the thread region 210 can be disposed in an internal surface of the hollow body 202 within the lower portion 206 or across both the upper and lower portions 204, 206. The upper portion 204 can also include a machined external surface 208 configured to matingly engage with the upper assembly 104 of the plasma arc torch 100, such as with the conductor 117 defining the upper assembly 104.

In some embodiments, at least a portion of the power contact 106 is non-axially symmetric with respect to a longitudinal axis A extending through the torch 100. For example, at least one of the upper portion 204 or the lower portion 206 can include a non-axially symmetric anti-rotation element to prevent the power contact 106 from rotating relative to the upper assembly 104 of the torch body after engagement. As shown in FIGS. 2*a* and *b*, the lower portion 206 includes an anti-rotation element 212 in the form of a shaped nut (e.g., a hexagonal nut). The anti-rotation element 212 can complement a recess 136 (e.g., having a hexagonal shape in the cross section) in the lower assembly 102 to prevent rotation/spinning of the power contact 106 relative to the upper assembly 104 after the power contact 106 is threaded to the lower assembly 102 and coupled to the upper assembly 104. In some embodiments, the upper portion 204 can be configured to include an anti-rotation element (not shown) same as or different from the anti-rotation element 212 of the lower portion 206. In some embodiments, the upper portion 204 and/or lower portion 206 of the power contact 106 can have a non-cylindrical cross section. The non-cylindrical cross section of the power contact 106 is adapted to complement a non-cylindrical cross section of the upper assembly 104 or lower assembly 102 to prevent rotation of the power contact 106 relative to the upper assembly 104. However, these anti-rotation features are optional elements of the present invention.

In some embodiments, the power contact 106 includes a contact region 214 disposed on an external surface of the hollow body 202 (e.g., on the external surface of the upper portion 206 of the hollow body 202). The contact region 214 is configured to mate with a Louvertac™ element 128 (e.g., a Louvertac™ band) in the upper assembly 104 of the torch body 107. The power contact 106 is electrically conductive such that the contact region 214 of the power contact 106 can convey a current through a current path comprising a power source (not shown), the torch body 107 and the Louvertac™ element 128 therein, the power contact 106 via the contact region 214, the electrode holder 110, and the remaining lower assembly 102. In some embodiments, current is conveyed to the power contact 106 through an axial stop (not shown) of the torch body 107.

Generally, the power contact 106 can be constructed from a conductive material, such as copper, brass, silver, a silver/copper alloy, and/or other materials having suitable electrical and thermal conductivity. In some embodiments, the material for constructing the power contact 106 can include silver plating or metal alloys to lower the contact resistance and improve conduction across the Louvertac™ contact region 214 and other contact areas.

In some embodiments, the power contact 106 provides a path for a coolant flow within its hollow body 202 to convey the coolant flow from the upper assembly 104 of the torch body 107 to the lower assembly 102, such as into the electrode holder 110 and/or the region surrounding or within the electrode 114. The lower assembly 102 can be otherwise sealed into the plasma torch 100 using fluid seals. In some embodiments, robust bullet plug seals, Louvertac sliding power contacts, large stub acme thread connections, non-potted lower torch assemblies, and water seals are used.

With reference to FIGS. 1*a* and *b*, the upper assembly 104, which is defined by the conductor 116 of the torch body 107, can include an aperture 130 configured to receive and matingly engage the upper portion 204 of the power contact 106. In some embodiments, at least one anti-rotation feature can be disposed on or adjacent to the aperture 130 to complement an anti-rotation element (not shown) on the external surface of the power contact 106. Upon insertion of the power contact 106 into the aperture 130, the complementary anti-rotation features can prevent rotation of the power contact 106, thus the electrode holder 110 and the lower torch assembly 102, relative to the upper torch assembly 104. For example, the aperture 130 and the external surface of the power contact 106 can have complementary non-cylindrical cross sections to prevent rotation of the power contact 106 relative to the upper torch assembly 104.

In some embodiments, the upper torch assembly 104 includes the Louvertac™ element 128 that is disposed in the aperture 130. The Louvertac™ element 128 is configured to physically and/or electrically communicate with the corresponding contact region 214 of the power contact 106 when the power contact 106 is inserted into the aperture 130.

In some embodiments, the lower assembly 102 of the torch 100 includes a power contact thread region 134 disposed on an external surface of the electrode holder 110. The power contact thread region 134 is adapted to matingly engage the thread region 210 in the internal surface of the power contact 106 that connects the lower assembly 102 to the upper assembly 104. Other means for connecting the lower assembly 102 to the power contact 106 is possible, such as through press fit.

In some embodiments, at least one anti-rotation feature can be disposed on or adjacent to a recess 136 in the lower assembly 102 to complement the anti-rotation element 212 (e.g., a hexagonal nut) on the external surface of the power contact 106. Upon threading of the power contact 106 with the lower assembly 102 and insertion of the power contact 106 into the aperture 130 of the upper assembly 104, the complementary anti-rotation features can prevent rotation of the power contact 106, thus the electrode holder 110 and the lower torch assembly 102, relative to the upper torch assembly 104. For example, the recess 136 can be shaped and dimensioned to complement the hexagonal nut 212 at the lower portion 206 of the power contact 106 to prevent rotation of the power contact 106 relative to the upper torch assembly 104.

Upon engagement of the power contact 106 with the lower assembly 102 and the upper assembly 104, the power contact 106 can set functional, radial and/or axial alignment of torch components within the torch. Specifically, the power contact 106 can substantially orient the consumable components of the lower assembly 102 relative to the upper assembly 104 of the torch body 107. For example, the power contact 106 can orient (e.g., radially and axially align) one or more of the electrode holder 110, gas baffle 112, gas sealing member 126, electrode 114 or nozzle 122 of the lower torch assembly 102 relative to the upper assembly 104.

Figure 3A:
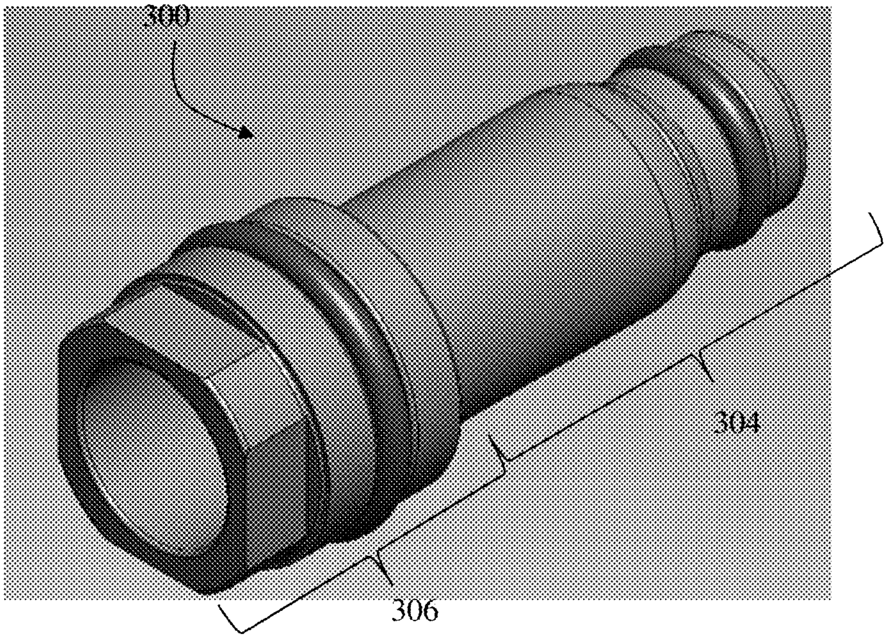
FIGS. 3*a* and *b* illustrate isometric and sectional views, respectively, of another power contact compatible with the plasma arc cutting torch of FIGS. 1*a* and *b*.
Figure 3B:
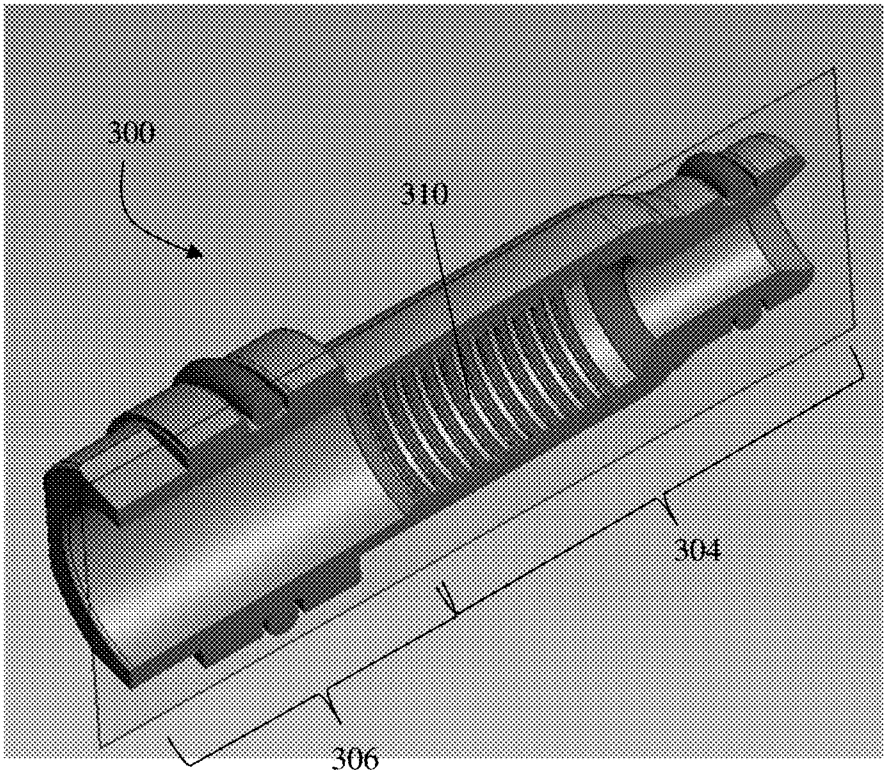

FIGS. 3*a* and *b* illustrate isometric and cross-sectional views, respectively, of another power contact 300 compatible with the plasma arc cutting torch 100 of FIGS. 1*a* and *b*. In some embodiments, the thread region 310 disposed on an internal surface of the power contact 300 is different from the thread region 210 of the power contact 106, such that the thread region 310 is configured to engage a different electrode holder, hence a different lower assembly, than the lower assembly 102 corresponding to the power contact 106. Therefore, the same upper assembly 104 of the torch 100 can be used with different lower assemblies by merely selecting the correct power contact to engage a desired lower assembly. In some embodiments, a kit can be provided with one upper torch assembly and multiple power contacts, enabling one torch to be converted by an end user or channel partner to be used with multiple platforms with different lower assemblies. Each of the multiple power contacts can be designed to engage a unique lower assembly. For example, design for a power contact can be varied to engage different styles of electrode holders. In some embodiments, a power contact receives one of two or more kinds of corresponding components (e.g., electrode holders). In some embodiments, a power contact holds the electrode holder into the torch body. In some embodiments, a power contact enables re-use of existing lower torch parts, including a contact ring, water tube, electrode holder, and gas baffle.

Figure 4:
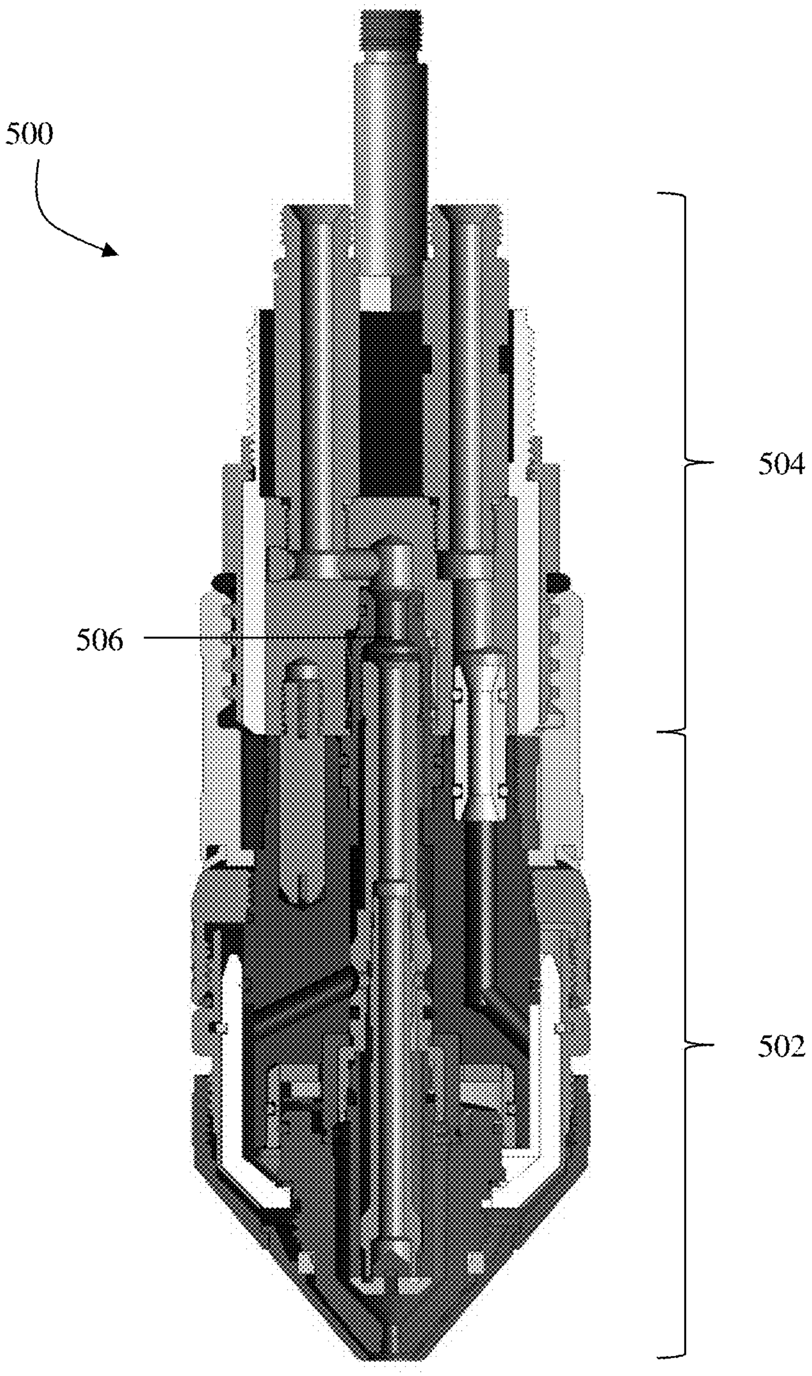
FIG. 4 illustrates a cross-sectional view of another liquid-cooled plasma arc cutting torch with an interchangeable lower torch assembly attached to an upper torch assembly by a power contact.

FIG. 4 illustrates a cross-sectional view of another liquid-cooled plasma arc cutting torch 500, according to some embodiments of the present invention. Similar to the torch 100 of FIGS. 1*a* and *b*, the torch 500 includes an interchangeable lower torch assembly (or lower assembly) 502 connected to an upper torch assembly (or upper assembly) 504 through a power contact 506. The power contact 506 can be the same as the power contact 106 of FIGS. 2*a* and *b*, the power contact 300 of FIGS. 3*a* and *b*, or another power contact design that allows the particular lower assembly 502 with a matching thread region as the thread region of the power contact 506 to be connected to the upper assembly 504 of the torch 500.

Figure 5:
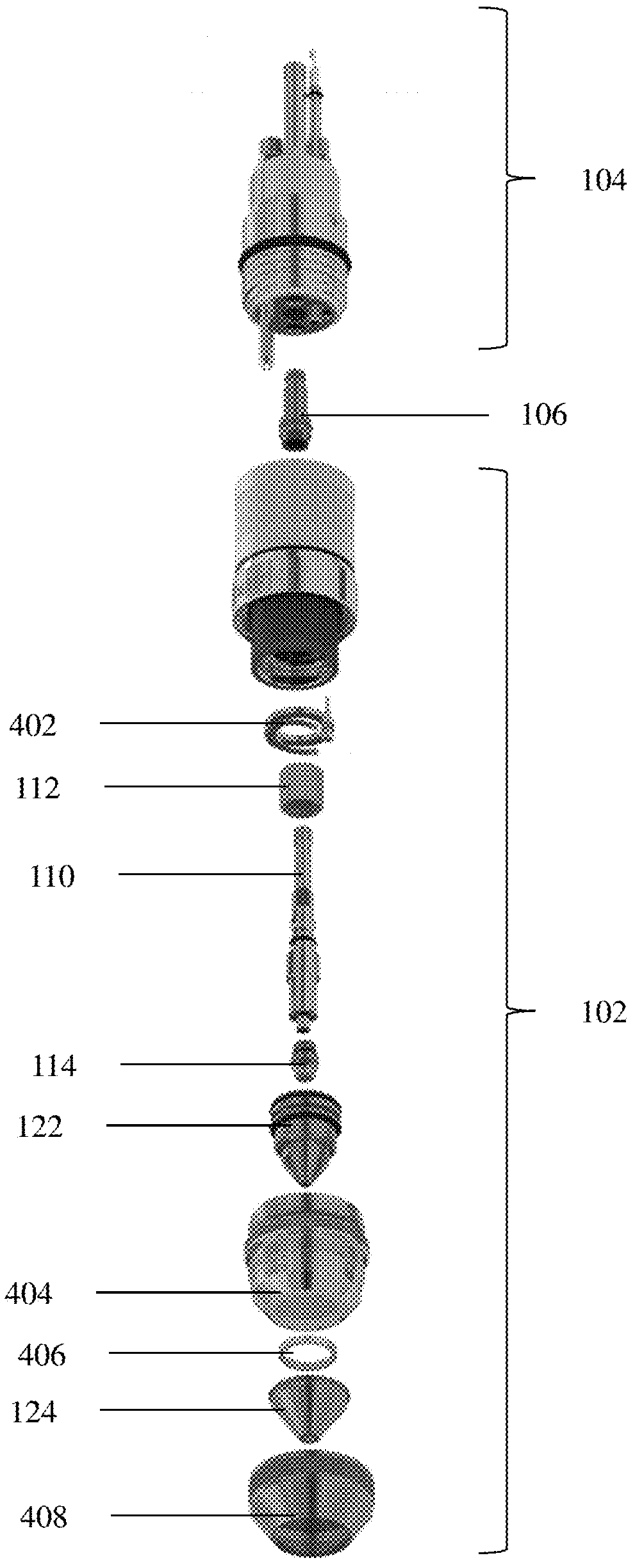
FIG. 5 shows an exploded view of a portion of the plasma arc cutting torch of FIGS. 1*a* and *b*.

FIG. 5 shows an exploded view of the plasma arc cutting torch 100 of FIGS. 1*a* and *b*, according to some embodiments of the present invention. FIG. 4 shows a portion of the upper assembly 104, a portion of the lower assembly 102 and the power contact 106 in an unassembled state. The lower assembly 102 can further include a number of consumable components including the gas baffle 112, contact ring 402, electrode holder 110, electrode 114, nozzle 122, diffuser 406, shield 124, nozzle retaining cap 404 and shield retainer 408. To connect the lower assembly 102 to the upper assembly 104, the power contact 106 can be first engaged with the upper assembly 104 via insertion of the upper portion 204 of the power contact 106 into the aperture 130 of the upper assembly 104. This may involve aligning an anti-rotation feature of the power contact 106 with a corresponding anti-rotation feature of the upper assembly 104 such that power contact 106 is prevented from rotating/spinning relative to the upper assembly 104. For example, the power contact 106 can comprise a non-cylindrical (e.g., hexagonal) cross section that is configured to complement a corresponding non-cylindrical cross section of the aperture 130 to prevent the relative rotation of the two components. The lower torch assembly 102 can be connected to the power connect 106 by press fit or by threading that allows the thread region 134 of the electrode holder 110 to matingly engage the thread region 210 of the power contact 106. This may also involve aligning an anti-rotation feature of the power contact 106 with a corresponding anti-rotation feature of the lower assembly 102. For example, the power contact 106 can comprise a shaped nut 212 in the lower portion 206 that is configured to complement a non-cylindrical cross section of the recess 136 to prevent the relative rotation of the two components. In other embodiments, the power contact 106 can be first connected to the lower assembly 102 prior to connection to the upper assembly 104.

In some embodiments, the power contact 106 is formed from an electrically conductive material and at least a portion of the upper assembly 104 is formed from a conductive material (e.g., brass). A current can be passed from a power source (not shown), through the upper assembly 104, to the lower assembly 102 via physical and/or electrical contact between the Louvertac™ element 128 disposed in the aperture 130 of the upper assembly 104 and the contact region 214 on the external surface of the power contact 106. In some embodiments, the substantially hollow body 202 of the power contact 106 passes a coolant flow from the upper assembly 104 to the lower assembly 102.

Generally, the present invention can improve the versatility, speed of changeover, and quality of the cutting setup. The interchangeability of the power contact allows backward and forward compatibility with multiple torch platforms by changing only one component. In addition, the power contact enables quick replacement of torch components and offline pre-staging of torch components, such as the shield, shield ring, retaining cap, diffuser, nozzle, gas baffle, electrode, and/or electrode holder. The technology enables field and factory repair and replacement of the lower torch assembly and components such as the electrode holder, water tube and gas baffle. In addition, the technology improves visibility of the gas baffle, electrode holder/water tube, and consumable seals that are in the lower assembly, and helps to ensure a leak-free, clean assembly. Assembly and visual inspection can be performed offline from the cutting process through the use of multiple lower torch assemblies. Thus, the present invention offers modularity, repairability, and presetting in one lower torch assembly.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A plasma arc torch for a liquid-cooled plasma arc cutting system comprising:
- an upper torch assembly defining an aperture;
- a lower torch assembly including a power contact thread region, wherein at least one of the upper torch assembly or the lower torch assembly includes a first anti-rotation feature; and
- a power contact for connecting the upper torch assembly with the lower torch assembly, the power contact including:
  - an external surface configured to matingly engage the upper torch assembly via insertion into the aperture, the power contact being slideably removable from the upper torch assembly;
  - an internal thread surface configured to matingly engage the lower torch assembly via the power contact thread region of the lower torch assembly, and
  - a second anti-rotation feature disposed on the external surface and adapted to complement the first anti-rotation feature to prevent rotation of the lower torch assembly relative to the upper torch assembly.

2. The plasma arc torch of claim 1, wherein the aperture and the power contact have complementary non-cylindrical cross sections.

3. The plasma arc torch of claim 1, wherein the upper torch assembly includes at least one Louvertac™ element disposed in the aperture to engage the power contact.

4. The plasma arc torch of claim 1, wherein the lower torch assembly includes an electrode holder with the power contact thread region disposed thereon for connection with the power contact.

5. The plasma arc torch of claim 1, wherein the power contact is electrically conductive and is configured to pass electricity from the upper torch assembly to the lower torch assembly.

6. The plasma arc torch of claim 1, wherein the power contact is configured to convey a coolant flow from the upper torch assembly to the lower torch assembly.

7. A method for connecting a lower torch assembly to an upper torch assembly of a liquid-cooled plasma arc torch, the method comprising:
- slideably engaging a power contact with the upper torch assembly of the plasma arc torch via insertion into an aperture of the upper torch assembly, the power contact being slideably removable from the upper torch assembly;
- connecting the lower torch assembly to the power contact;
- preventing rotation of the power contact relative to the upper torch assembly by aligning an anti-rotation feature of the power contact with a corresponding anti-rotation feature of the lower torch assembly or upper torch assembly; and
- passing at least one of a current or a coolant flow from the upper torch assembly to the lower torch assembly via the power contact.

8. The method of claim 7, further comprising radially and axially aligning at least one of an electrode holder, a nozzle or a gas baffle of the lower torch assembly relative to the upper torch assembly.

9. The method of claim 7, further comprising forming the power contact from an electrically conductive material.

10. The method of claim 7, further comprising forming the lower torch assembly from an insulator material.

* * * * *